(12) United States Patent
Van Toorenburg

(10) Patent No.: US 7,439,909 B2
(45) Date of Patent: Oct. 21, 2008

(54) ANTENNA SELECTION IN A POSITIONING SYSTEM

(75) Inventor: Leon Lammers Van Toorenburg, Wellington (NZ)

(73) Assignee: Surveylab Group Limited, Wellington (NZ)

( * ) Notice: Subject to any disclaimer, the term of this patent is extended or adjusted under 35 U.S.C. 154(b) by 75 days.

(21) Appl. No.: 11/603,898

(22) Filed: Nov. 24, 2006

(65) Prior Publication Data

US 2008/0024363 A1 Jan. 31, 2008

(30) Foreign Application Priority Data

Jul. 27, 2006 (NZ) .................................. 548814

(51) Int. Cl.
*G01S 5/14* (2006.01)

(52) U.S. Cl. ................................. 342/357.15
(58) Field of Classification Search ............ 342/357.15, 342/357.06
See application file for complete search history.

(56) References Cited

U.S. PATENT DOCUMENTS

| | | | | |
|---|---|---|---|---|
| 5,731,757 A | * | 3/1998 | Layson, Jr. ............. | 342/357.07 |
| 5,825,327 A | * | 10/1998 | Krasner .................. | 342/357.09 |
| 6,563,458 B2 | * | 5/2003 | Aizawa et al. ......... | 342/357.06 |
| 2002/0060615 A1 | * | 5/2002 | Kodim ..................... | 333/101 |
| 2005/0043888 A1 | * | 2/2005 | Kang ........................ | 701/213 |
| 2005/0057404 A1 | * | 3/2005 | Demicco et al. ........... | 343/702 |
| 2007/0152880 A1 | * | 7/2007 | Chang et al. ............ | 342/357.15 |
| 2007/0213017 A1 | * | 9/2007 | Chen et al. .................. | 455/101 |

FOREIGN PATENT DOCUMENTS

| | | |
|---|---|---|
| JP | 9-178832 | 7/1997 |
| JP | 2000-338221 | 12/2000 |
| JP | 2003-240834 | 8/2003 |
| JP | 2004-144676 | 5/2004 |
| JP | 2005017260 A * | 1/2005 |

OTHER PUBLICATIONS

English translation of JP 2005017260 A.*

* cited by examiner

*Primary Examiner*—Thomas H. Tarcza
*Assistant Examiner*—Fred H. Mull
(74) *Attorney, Agent, or Firm*—Nixon & Vanderhye P.C.

(57) ABSTRACT

A positioning system includes a positioning device with a local antenna. One or more remote antennas are also connected to the device. The system selects one or more antennas to use in determining a position based at least in part on an orientation of the device. Other factors which may be used in selection include: a particular environment of the device, manual override, signal quality, and a stage in a workflow process.

29 Claims, 5 Drawing Sheets

ANTENNA SELECTION IN A POSITIONING SYSTEM

FIELD OF THE INVENTION

The invention relates to a system and method for selecting antennas in a positioning system.

BACKGROUND OF THE INVENTION

Positioning devices incorporating GPS antennas are well known. These devices usually include a single internal antenna which is used for all position measurements. Such a positioning device is described in the commonly assigned application published as US 20060100816, the contents of which are incorporated by reference herein.

Alternatively, a single external antenna may be connected to the device, giving substantially similar capabilities. Some devices use both an internal and an external antenna. These devices generally use the external antenna when it is connected to the device, and the internal antenna when no external antenna is connected. Other devices use switching mechanisms for switching between internal and external antennas. For example, U.S. Pat. No. 6,563,458 describes a GPS receiver with an internal antenna and an external antenna. The receiver switches between the internal antenna and the external antenna based on whether an acceptable signal is available from the internal antenna.

However, prior positioning devices fail to provide for selection of GPS antennas in a way which reflects the manner of use of such devices. This results in inconvenience and inaccuracies in positions measured.

SUMMARY OF THE INVENTION

It is an object of the invention to provide an improved method and system for selecting GPS antennas in a positioning system, or at least to provide the public with a useful choice.

In a first aspect the invention provides a positioning system including:

a positioning device having a local GPS antenna;

at least one remote GPS antenna; and a selection arrangement configured to select one or more of the GPS antennas to use in determining a position, the selection being based at least in part on an orientation of the device.

This aspect also extends to a method of controlling a positioning system, including:

determining an orientation of a positioning device having a local GPS antenna; selecting one or more GPS antennas from the local GPS antenna and one or more remote GPS antennas, the selection being based at least in part on the orientation of the device; and determining a position using the selected antenna(s).

In a third aspect the invention provides a positioning system including:

a positioning device having a local GPS antenna;

at least one remote GPS antenna;

a sensing arrangement configured to determine whether the device is in a particular environment; and a selection arrangement configured to select one or more of the GPS antennas to use in determining a position, the selection being based at least in part on whether the device is in the particular environment.

BRIEF DESCRIPTION OF THE DRAWINGS

The invention will now be described by way of example only with reference to the accompanying drawings, in which.

DESCRIPTION OF THE INVENTION

1. The Positioning Device and the Positioning System

Figure 1:
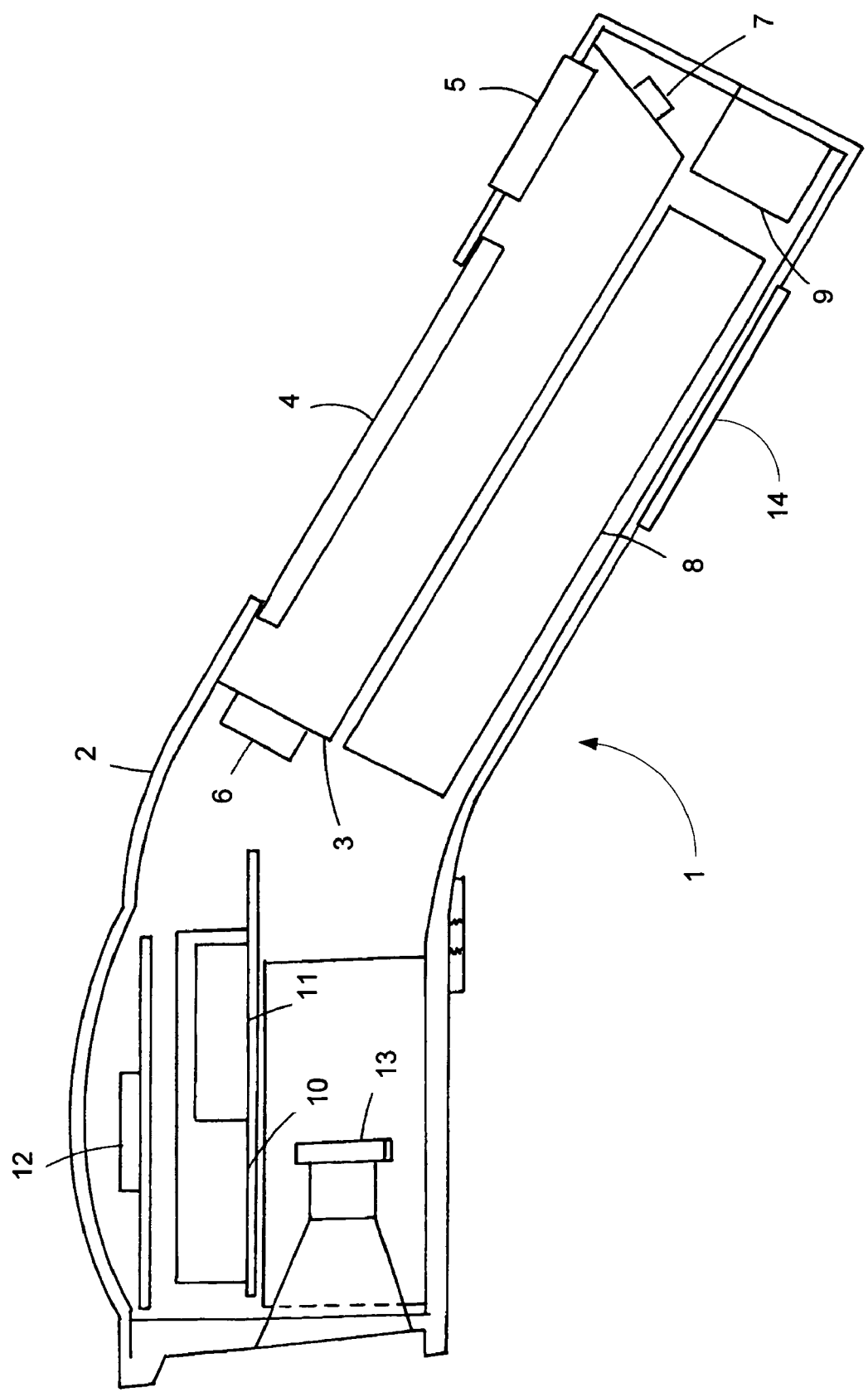
FIG. 1 shows an embodiment of a positioning device from the exterior.
Figure 2:
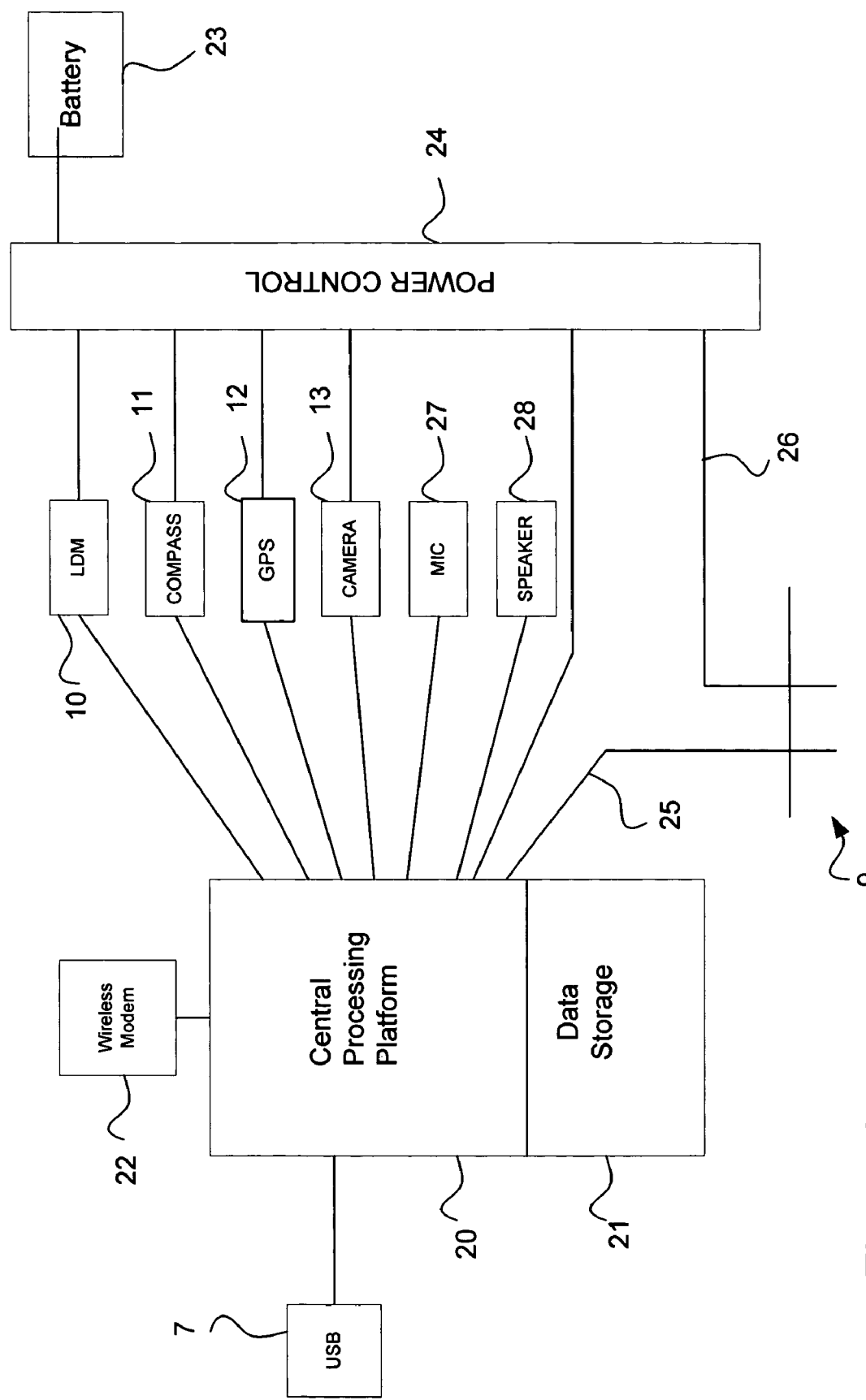
FIG. 2 is a block diagram showing the major components of the device of FIG. 1.

FIG. 1 shows a positioning device 1. This device may be similar to the positioning device described in US 20060100816. Connections between the components are omitted in FIG. 1 for clarity but are shown in FIG. 2.

This device is capable of accurate measurements of positions of remote objects, by use of a compass, GPS and laser distance meter.

The device has a housing 2 which contains an IPaq™ PDA 3 with a touch-sensitive display screen 4, keypad 5, antenna 6 and USB port 7. The PDA 3 includes a central processing platform 20 (shown in FIG. 2), data storage 21, and wireless modem 22 (for driving the antenna 6). A power supply and control module 8 (shown in FIG. 1) includes a battery 23, and power control circuitry 24 (shown in FIG. 2). An external I/O port 9 includes a socket (not shown) for receiving a cable connected to an external device. The external I/O port 9 is coupled to an RS232 serial data line 25 and a power line 26 (shown in FIG. 2). This allows the recording of information from a sensor not integrated with or contained in the housing 2, for example a depth sounder, pH meter, thermometer etc. The port 9 may be replaced by an alternative physical port (such as a USB or coaxial port) or by a wireless connection (such as a Bluetooth or Wireless Lan port), allowing external sensors and devices to communicate with the PDA 3 via the antenna 6.

The positioning device 1 may include a laser distance meter 10, compass 11, local GPS antenna 12, camera 13, microphone 27 and speaker 28 (not shown in FIG. 1). The device may also include a contact sensor 14, for determining whether the device is being held in a user's hand.

The power to each instrument 10-14, 27, 28 (and also to any external sensors, not shown, which might be connected to the external I/O port 9) is controlled by the central processing platform 20, in conjunction with the power control circuitry 24.

The local GPS antenna may be located within the device (an internal antenna), integrally with the device, or may be attached to the outside of the housing 2. In any case, the local GPS antenna is preferably fixed in relation to the device.

Figure 3:
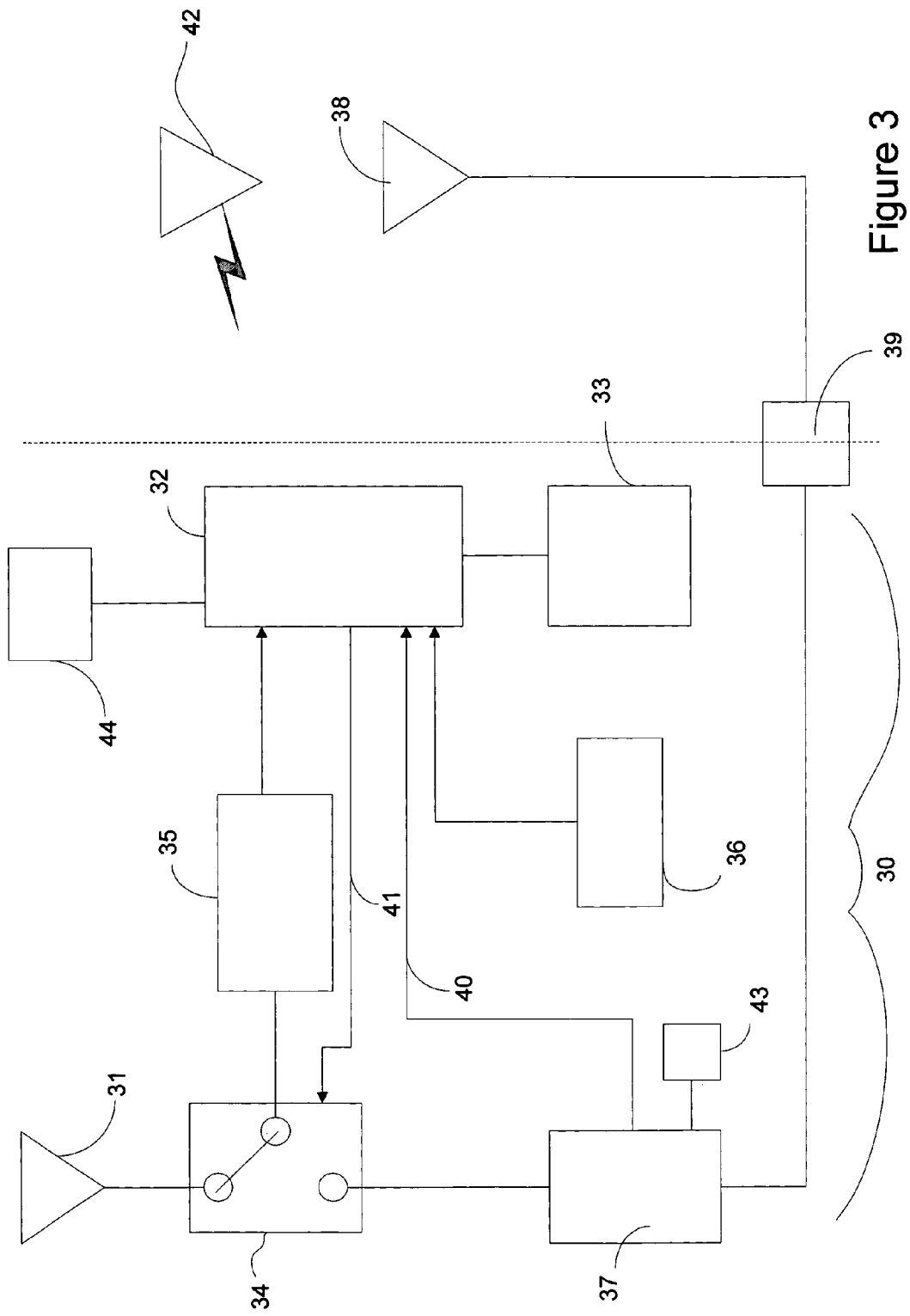
FIG. 3 is a block diagram of an embodiment of a positioning system.

FIG. 3 shows a preferred embodiment of the positioning system. The system includes a positioning device 30, with a local GPS antenna 31 connected via receiving circuitry to a computer 32 having a combined display and touch screen 33. The receiving circuitry includes an RF switch 34 and a receiver module 35, which is arranged to receive a radio signal from the antenna and to output position data to the computer. This position data may include information relating to the signal quality received by the GPS antenna.

The positioning device 30 also includes a sensor 36 for determining an orientation of the device. The sensor may be an inclinometer or basic compass, or a more complex sensor capable of determining an absolute orientation of the device. For example, in US 20060100816, a compass is described incorporating three magnetic field sensors and two inclinometers. An example of such a compass is AOSI's EZ-Tilt 3, http://www.aositilt.com/Compass.htm. Thus, an orientation sensed by this sensor may be an inclination, bearing or absolute orientation. The positioning device may include one or more other sensors as discussed above.

The positioning device also includes a remote antenna module 37. This module is arranged to sense connection of a remote antenna 38 to the positioning device 30 via a remote antenna connection 39. Most remote GPS antennas include a pre-amplifier, require a voltage of about 5V and draw a DC current of about 10-20 mA over a coaxial line from a device to which they are attached. Connection by this method may be sensed by maintaining a suitable voltage over the coaxial line and measuring the current drawn. When a remote antenna is connected, the remote antenna module 37 passes a signal indicating this connection to the computer 32 over the signal line 40. The remote antenna connection may be a physical port, such as a coaxial or USB port.

Alternatively, any suitable wireless connection may be used, including RF links, Bluetooth etc. Of course, where a wireless connection is used, the remote GPS antenna 42 is provided with its own power source and connection must be detected by monitoring communications received by the positioning device via an antenna 43.

The remote antenna module 37 receives signals from the remote antenna 38. This module 37 is DC isolated from the RF switch 34, passing only the radiofrequency signal from the remote antenna to the RF switch. Thus, signals from the remote antenna 38 are also supplied to the receiver module 35 via the RF switch 34 (when closed). This switch is controlled by the computer 32 over control line 41, preferably by logic level signals, and is arranged to select between the local antenna 31 and the remote antenna 38. The RF switch 34 is preferably a single pole double throw (SPDT) switch, which may be provided by a pair of PIN diodes, a relay or other suitable arrangement. The switch 34 preferably has minimal insertion loss for GPS signals.

Any other switching arrangement for selecting between antennas may also be suitable. Also, more than one remote antenna may be provided. Any one or more of the local antenna and the remote antennas can then be used to determine a position.

The positioning device may also include one or more environment sensors 44, arranged to determine whether the device is in a particular environment. The environment sensor 44 may be a contact sensor (such as sensor 14 shown in FIG. 1), arranged to determine whether the device is being held in a user's hand. The environment sensor 44 may be arranged to determine whether the device is situated in a cradle, such as the cradles used for storing and charging portable devices and/or connecting portable devices to a computer. The environment sensor 44 may be arranged to determine whether the device is situated in a holster, such as a holster located on a user's belt or backpack. Various means for making this determination may be suitable. An antenna may then be selected based on whether the positioning device is in a particular environment. For example, if the device is in a cradle or holster, it may be more appropriate to use the remote antenna. If the device is being held in a user's hand, then the local antenna may be more appropriate.

The computer 32 receives information from the remote antenna module 37, orientation sensor 36, receiver module 35 and any other sensors 44. This information is used in selection of the local or remote antenna and the computer 32 then controls the switch 34 according to the antenna selected. The antenna selection may be indicated on the device using LEDs or on the touch screen.

Figure 4:
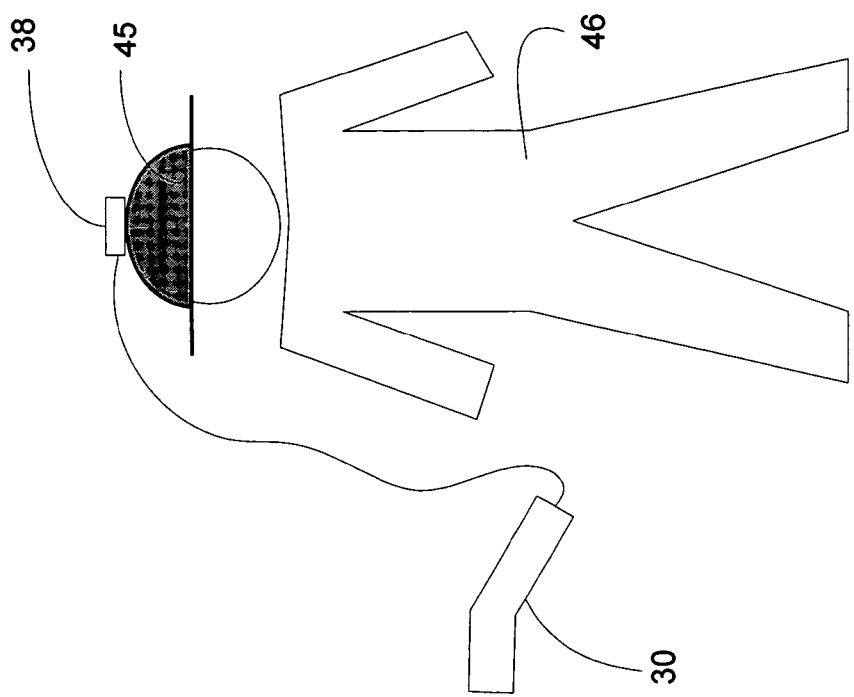
FIG. 4 shows the positioning system of FIG. 3, in use.
Figure 4:
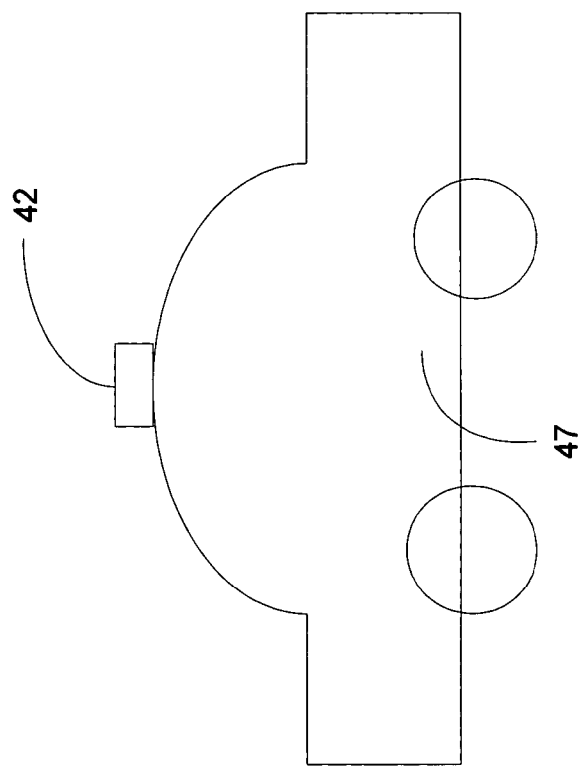

In use, the remote antenna 38, connected to the device 30 via a wired connection, may be mounted on the backpack, hat or helmet 45 of a user 46 (FIG. 4). An antenna 42, connected to the device via a wireless connection, may be mounted on the back, hat or helmet of the user, or may be mounted on a vehicle 47 or in any other suitable position.

2. Use of the Positioning Device and the Positioning System

Various factors are relevant in selecting one or more antennas to use in determining a position. A local antenna gives a more accurate indication of the device's position, since the relative positions of the antenna and the device are known. This is particularly important in more complex positioning devices, such as that of FIG. 1, since knowledge of the vector between the antenna and the laser distance meter provides for more accurate measurements of remote positions. The local antenna is also more convenient to use, since it is generally part of the device.

Use of a remote antenna creates an unknown vector between the antenna and the device, causing uncertainties in the measurement. Various methods may be used to reduce the uncertainty and these are discussed below. Also a remote antenna may not always be available. However, remote antennas generally provide greater sensitivity than local antennas.

Moreover, a GPS antenna provides the best measurement when it is properly oriented, with a large number of satellites in view and in the absence of multipath or obstructions. A local antenna is often not properly oriented. For example, a positioning device may be at an inappropriate orientation when it is hanging from a shoulder strap, being carried in a backpack or holster, or in a vehicle-mounted cradle. A particular measurement may require a device to be held at an angle which is detrimental to the local antenna signal. In these circumstances it may be best to use a remote antenna which is properly oriented, providing a superior position measurement. This measurement, even when combined with any uncertainty related to the vector between the device and the remote antenna, is often superior to the measurement obtained from a local antenna with a weak signal.

In use, it is sometimes desirable to maintain a log of the path followed by the positioning device, i.e. to track the device over a period of time. The measurements from a remote antenna may be acceptable for tracking purposes, but more accurate position measurements may be required when a particular type of measurement is taken. Thus, selection of an antenna may depend on a stage of a workflow process.

Figure 5:
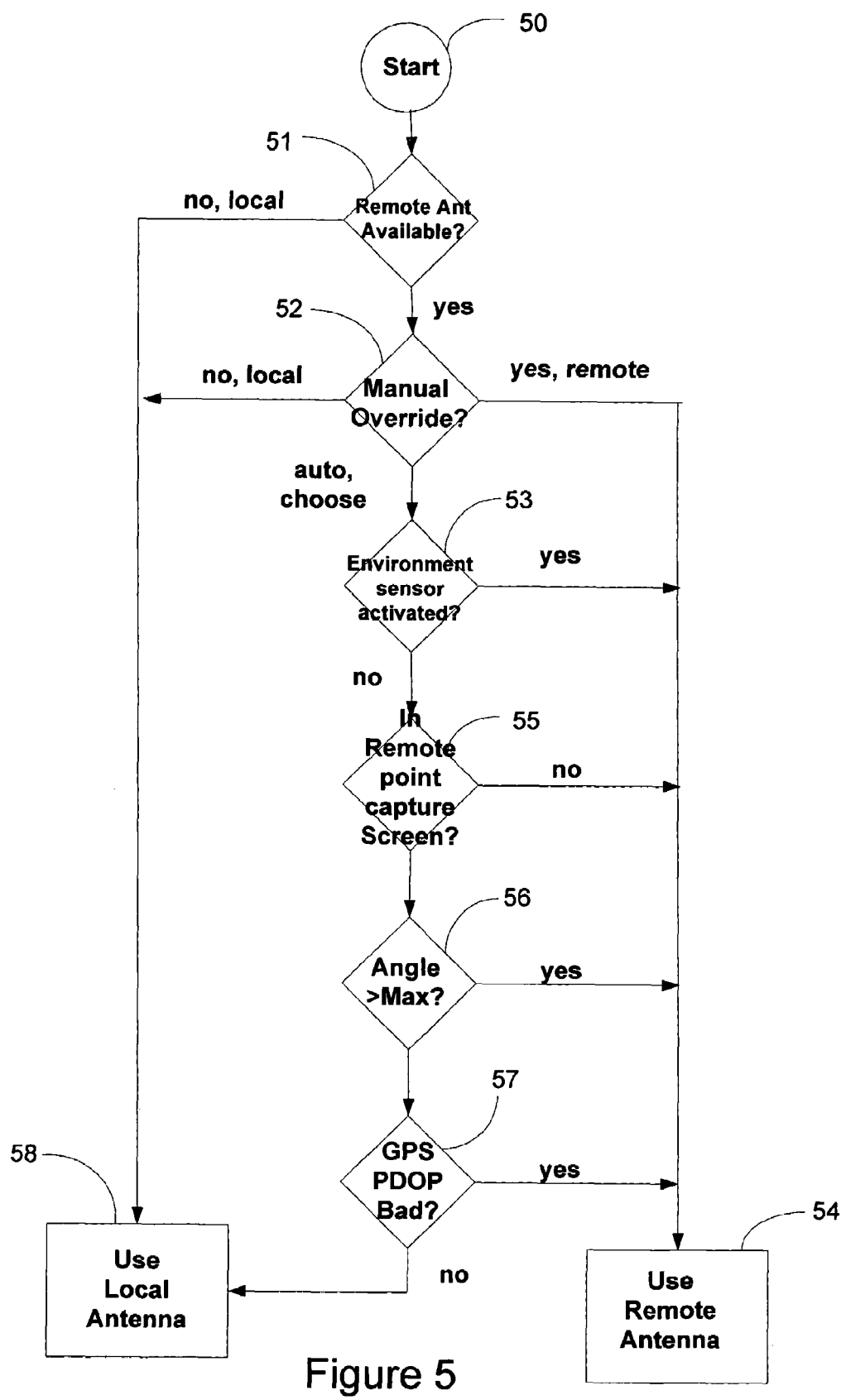
FIG. 5 is a flow diagram showing a workflow for use in a positioning system.

FIG. 5 shows a flow diagram for selection of an antenna in one embodiment. From the start stage 50, the device determines whether a remote antenna is available at step 51. If no remote antenna is available, the local antenna 58 must be used. If a remote antenna is available, the device determines at step 52 whether a manual override has been activated. If a remote antenna is available the user may manually override to select the local antenna by selecting "no" or the remote antenna by selecting "yes" or automatic selection by pressing "auto" (automatic selection may be used if no input is received within a specified time). If "auto" is selected then it is determined whether an environment sensor has been activated in step 53. If so the remote antenna will be used and if not processing continues to step 55. At step 55 the device determines whether a particular stage in the workflow process has been reached. If the device is not displaying the 'remote point capture screen' screen, then the remote antenna is used. The remote point capture screen represents a particular stage of the workflow process in which the device commences capture of a position measurement. As discussed above, it is desirable at this stage to use a local antenna. If this screen has not been reached, the remote antenna is used 54. If this screen has been reached, the device determines an orientation of the device 56. Preferably the orientation is an inclination of the device. If the angle of inclination from the horizontal plane is greater than a threshold, then the remote antenna is used 54. Otherwise, the device detects the signal quality from the local antenna 57. Here the signal quality is detected as Position Dilution of Precision (PDOP). Other forms of Dilution of Precision, such as horizontal (HDOP) and vertical (VDOP) may be suitable. If the signal quality from the local antenna is poor, the remote antenna is used. Otherwise the local antenna is used.

Of course, many different algorithms for selecting an antenna may be used based on the various factors and the purpose for which measurements are being made.

3. Uncertainty Reduction

The uncertainty caused by the vector between the positioning device and a remote antenna may be reduced in one of the following manners.

A user may input a manual correction. This may simply be an estimate of the magnitude of the vector and/or the direction of the vector.

The instruments included in the device may be used to reduce the uncertainty. The bearing of the device is known from the compass 11. The magnetic north reading may be corrected to a true north reading using the known position in conjunction with a correction table. Based on an assumption as to the direction in which the device is pointing, relative to the remote antenna, we can assign a direction to the vector. For example, if a remote antenna is mounted on a user's backpack, we can assume that the device is pointing directly away from the remote antenna, since users generally orient the device away from themselves. The user may then input information relating to the magnitude of the vector and the vertical offset.

Where the remote antenna is positioned away from the device, the device itself may be used to make an accurate determination of the vector. For example, a remote antenna may be mounted on a vehicle. A user leaves the vehicle to make a measurement, then points the device at the vehicle, or the remote antenna mounted on the vehicle. Using the device's compass and laser distance meter it is possible to determine the vector.

Finally, as the remote antenna and the device communicate by a RF link, it is possible to use time-of-flight measurements to determine a magnitude of the vector. This may be used in conjunction with a manual user input of the vector direction. Various combinations of the above uncertainty reduction methods may also be suitable.

The invention provides an automated method of switching between local and remote antennas. This provides more accurate positioning results in a convenient manner and reflects the manner in which positioning devices may be used. This allows a user's position to be more effectively tracked while he or she is travelling by foot or by vehicle, with the positioning device hanging from a strap, or in a holster or cradle.

While the invention has been described with reference to GPS technology, the term GPS should be interpreted to encompass any similar satellite positioning system.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A positioning system including:
   i. a positioning device having a local GPS antenna;
   ii. at least one remote GPS antenna; and
   iii. a selection arrangement configured to select one or more of the GPS antennas to use in determining a position, the selection being based at least in part on an orientation of the device.

2. A positioning system as claimed in claim 1, wherein the orientation is an inclination of the device.

3. A positioning system as claimed in claim 2, wherein the positioning device includes an inclinometer arranged to determine the inclination of the device.

4. A positioning system as claimed in claim 1, further including a sensor arranged to determine when the positioning device is in a particular environment, wherein the selection is based in part on whether the positioning device is in the particular environment.

5. A positioning system as claimed in claim 4, wherein the particular environment is one of a cradle environment; a holster environment; and a handheld environment.

6. A positioning system as claimed in claim 1, further including a user interface arranged to enable manual override of the selection, such that a user can manually select one or more of the GPS antennas to use in determining a position.

7. A positioning system as claimed in claim 1, arranged to detect a signal quality from one or more of the GPS antennas, wherein the selection is based in part on the signal quality detected.

8. A positioning system as claimed in claim 7, wherein the signal quality is detected as dilution of precision (DOP).

9. A positioning system as claimed in claim 1, wherein the selection is based in part on a stage reached in a workflow process of the positioning device.

10. A positioning system as claimed in claim 1, wherein the positioning device includes a camera and laser distance meter.

11. A positioning system as claimed in claim 1, arranged to track the position of the positioning device.

12. A positioning system as claimed in claim 1, wherein at least one remote antenna is connected to the positioning device by a wired connection.

13. A positioning system as claimed in claim 1, wherein at least one remote antenna is connected to the positioning device by a wireless connection.

14. A positioning system as claimed in claim 1, wherein at least one remote antenna is arranged to be mounted on one of: a user's backpack; a user's hat or helmet; and a vehicle.

15. A positioning system as claimed in claim 1, wherein the selection arrangement includes:
   a processor arranged to receive orientation signals indicative of the orientation of the device and to select one or more antennas based on the orientation signals; and
   a switching arrangement for switching between the antennas.

16. A method of controlling a positioning system, including:
  i. determining an orientation of a positioning device having a local GPS antenna;
  ii. selecting one or more GPS antennas from the local GPS antenna and one or more remote GPS antennas, the selection being based at least in part on the orientation of the device; and
  iii. determining a position using the selected antenna(s).

17. A method as claimed in claim 16, wherein the orientation is an inclination of the device.

18. A method as claimed in claim 16, further including determining whether the positioning device is in a particular environment, wherein the selection is based in part on whether the positioning device is in the particular environment.

19. A method as claimed in claim 18, wherein the particular environment is one of a cradle environment; a holster environment; and a handheld environment.

20. A method as claimed in claim 16, further including enabling a user to manually override the selection, such that a user can manually select one or more of the GPS antennas to use in determining a position.

21. A method as claimed in claim 16, including detecting a signal quality from one or more of the GPS antennas, wherein the selection is based in part on the signal quality.

22. A method as claimed in claim 21, wherein the signal quality is detected as dilution of precision (DOP).

23. A method as claimed in claim 16, wherein the selection is based in part on a stage reached in a workflow process of the positioning device.

24. A method as claimed in claim 16, including tracking the position of the positioning device.

25. A method as claimed in claim 16, wherein at least one remote antenna is selected for determining the position of the device, including:
  correcting for the offset between the position of the remote antenna and the position of the positioning device.

26. A method as claimed in claim 25, wherein correcting for the offset includes receiving manual input from a user, the input representing the offset.

27. A method as claimed in claim 25, wherein correcting for the offset includes determining the direction of the offset based on the reading from a compass in the positioning device and an assumption that the positioning device is pointing away from the external antenna.

28. A method as claimed in claim 25, wherein correcting for the offset includes determining the magnitude of the offset using a time of flight measurement between the remote antenna and the positioning device.

29. A method as claimed in claim 25, wherein the positioning device includes an orientation sensor and a distance meter and wherein correcting for the offset includes using the orientation sensor and distance meter to determine the orientation and magnitude of the offset.

* * * * *